(12) United States Patent
Chlebovec

(10) Patent No.: US 12,269,697 B2
(45) Date of Patent: Apr. 8, 2025

(54) WEAR RESISTANT BLOW-THROUGH ROTARY VALVE

(71) Applicant: Schenck Process Europe GmbH, Darmstadt (DE)

(72) Inventor: Michal Chlebovec, Poprad-Velka (SK)

(73) Assignee: Schenck Process Europe GmbH, Darmstadt (DE)

( * ) Notice: Subject to any disclaimer, the term of this patent is extended or adjusted under 35 U.S.C. 154(b) by 456 days.

(21) Appl. No.: 17/885,283

(22) Filed: Aug. 10, 2022

(65) Prior Publication Data

US 2022/0380146 A1 Dec. 1, 2022

Related U.S. Application Data

(63) Continuation of application No. PCT/EP2021/052469, filed on Feb. 3, 2021.

(30) Foreign Application Priority Data

Feb. 11, 2020 (GB) ..................................... 2001853

(51) Int. Cl.
*B65G 53/46* (2006.01)
*B65G 53/52* (2006.01)

(52) U.S. Cl.
CPC ....... *B65G 53/4633* (2013.01); *B65G 53/523* (2013.01)

(58) Field of Classification Search
None
See application file for complete search history.

(56) References Cited

U.S. PATENT DOCUMENTS

| | | | | |
|---|---|---|---|---|
| 2,757,049 A | * | 7/1956 | Temple | B65G 53/4633 406/67 |
| 2,852,315 A | * | 9/1958 | Lenhart | B65G 53/4641 406/67 |
| 2,960,245 A | * | 11/1960 | Hans | B65G 53/4633 406/67 |
| 2,984,872 A | * | 5/1961 | France | D01B 1/04 19/48 R |
| 3,085,834 A | * | 4/1963 | Woten | E04F 21/12 406/53 |
| 3,223,288 A | * | 12/1965 | Stern | B65G 53/4633 406/67 |
| 3,231,105 A | * | 1/1966 | Easley, Jr. | B65G 53/4633 222/368 |

(Continued)

FOREIGN PATENT DOCUMENTS

| | | |
|---|---|---|
| CA | 834621 A | 2/1970 |
| GB | 2091672 A | 8/1982 |
| JP | 2005200173 A | 7/2005 |

OTHER PUBLICATIONS

International Search Report dated May 12, 2021 in corresponding application PCT/EP2021/052469.

(Continued)

*Primary Examiner* — Joseph A Dillon, Jr.
(74) *Attorney, Agent, or Firm* — Muncy, Geissler, Olds & Lowe, P.C.

(57) ABSTRACT

A blow-through rotary valve is provided which has a modified geometry to reduce wear from pneumatic conveying of particulate and/or bulk material.

24 Claims, 4 Drawing Sheets

(56) References Cited

U.S. PATENT DOCUMENTS

| | | | |
|---|---|---|---|
| 3,949,888 A * | 4/1976 | Gessler | B65D 88/64 |
| | | | 414/326 |
| 4,009,912 A * | 3/1977 | Mraz | B65G 53/14 |
| | | | 406/120 |
| 4,015,754 A * | 4/1977 | Leurs | B65G 53/4633 |
| | | | 406/67 |
| 4,243,351 A * | 1/1981 | Legille | C21B 7/20 |
| | | | 414/199 |
| 4,906,144 A * | 3/1990 | Matsueda | B65G 53/4633 |
| | | | 406/65 |
| 5,031,546 A * | 7/1991 | Amos | B61D 7/32 |
| | | | 105/248 |
| 5,403,141 A * | 4/1995 | Rauser | B65G 69/0458 |
| | | | 414/301 |
| 5,586,966 A * | 12/1996 | Wood | B04B 1/00 |
| | | | 494/37 |
| 5,933,920 A * | 8/1999 | Winn | D01B 1/04 |
| | | | 19/40 |
| 6,422,490 B1 * | 7/2002 | Truan | A01C 15/18 |
| | | | 239/677 |
| 6,666,627 B1 | 12/2003 | Wysong | |
| 6,669,411 B2 * | 12/2003 | Salley, Jr. | B65G 53/4691 |
| | | | 406/64 |
| 6,966,466 B2 * | 11/2005 | Jensen | B65G 53/4633 |
| | | | 222/368 |
| 7,757,903 B2 * | 7/2010 | Schwartz | G01F 13/001 |
| | | | 222/218 |
| 8,474,597 B2 | 7/2013 | Pier et al. | |
| 9,187,247 B2 * | 11/2015 | Patton | B65G 11/126 |
| 10,745,875 B2 * | 8/2020 | Gamble, II | B65G 33/10 |
| 10,793,358 B1 * | 10/2020 | Lwali | B65G 11/063 |
| 11,541,489 B2 * | 1/2023 | Chlebovec | B65G 53/4633 |
| 11,628,446 B2 * | 4/2023 | Gingras | B02C 7/02 |
| | | | 241/261.1 |
| 12,084,298 B2 * | 9/2024 | Chlebovec | B65G 65/48 |
| 2010/0237267 A1 * | 9/2010 | Chuang | B65G 53/4633 |
| | | | 251/304 |
| 2020/0406210 A1 * | 12/2020 | Hoener | B01J 19/1818 |
| 2022/0042607 A1 * | 2/2022 | Newton | F16K 27/067 |
| 2022/0322634 A1 * | 10/2022 | Tu | B65G 11/206 |
| 2022/0373173 A1 * | 11/2022 | Chlebovec | B65G 65/4881 |
| 2022/0380147 A1 * | 12/2022 | Chlebovec | B65G 53/4641 |

OTHER PUBLICATIONS

Written Opinion of the International Searching Authority dated May 12, 2021 in corresponding application PCT/EP2021/052469.

* cited by examiner

WEAR RESISTANT BLOW-THROUGH ROTARY VALVE

This nonprovisional application is a continuation of International Application No. PCT/EP2021/052469, which was filed on Feb. 3, 2021, and which claims priority to Great Britain Patent Application No. 2001853.7, which was filed in Great Britain on Feb. 11, 2020, and which are both herein incorporated by reference.

BACKGROUND OF THE INVENTION

Field of the Invention

The present invention relates to a blow-through rotary valve. More particularly, the present invention relates to a blow-through rotary valve which has a modified geometry to reduce wear from pneumatic conveying of particulate and/or bulk material.

Description of the Background Art

Pneumatic conveying by pressure is employed to transport particulate and/or bulk materials along a pipeline. The technique is employed to transport materials over distances typically in the range from about 10 m to 200 m, and in some cases even further. Pneumatic conveying avoids the need for the use of conveyor belts or the like, which can be bulky and costly to maintain.

Blow-through rotary valves have been used for feeding bulky, high-wear, high-viscosity materials to pneumatic conveying lines for many years. Example materials which may be transported are 'alternative fuels' or 'refuse derived fuels' (RDF). These materials may comprise wood chips, production waste, shredder fraction, shredded tires, recycled waste, and waste dust.

Some material parameters may be grain size, where smaller particles flow easier than large particles; grain shape, where the more regular particles flow easier than irregular shaped particles; bulk density, where lighter particles flow easier than heavier particles; moisture, where dry particles flow easier than moist particles; and grease content, where greasier particles flow with more resistance than clean particles.

The main task of blow-through rotary valves for RDF or similar materials is to introduce lightweight, abrasive, sticky and bulky materials into a narrow conveying pipeline which is under positive pressure. The materials are fed into a hopper dosing device which is positioned above the rotary valve. The valve comprises cellular rotors which act as buckets to transport the material from above the valve to below the valve. As the cellular rotors rotate about the drive axis, the contents of an individual cellular rotor are emptied into a trough, which forms part of the conveying line. The conveying line has high velocity air blowing through, which captures and introduces the RDFs into the pipeline.

One problem with the blow-through valves found in the art is that the materials passing through the valves can be extremely abrasive, therefore resulting in excessive wear. One of the areas most subjected to wear is the area surrounding the outlet of the valve. This area is where the valve is connected to the outlet cone, which is then connected to the pneumatic pipeline. The reason for this area having a high wear rate is that there is a large rotational velocity component of the material being conveyed, and a comparatively lower velocity component of the material in the direction of the airflow, which is parallel to the direction of the pipeline. This results in the material leaving the cellular rotor with a velocity vector which is not parallel with the axis of the pneumatic pipeline, therefore causing excessive wear on one side of the outlet flange. Particles hitting the area with a high impact angle results in a 'sand blasting' effect.

This 'sand blasting' effect is usually most pronounced on one side of the trough, or on the outlet of the valve itself. The troughs installed onto the valves are usually symmetrical, and the sides of the troughs are usually equidistant to the centerline of the valve at any particular location along the longitudinal axis of the trough.

SUMMARY OF THE INVENTION

It is therefore an object of the present invention to obviate or mitigate at least one or more of the aforementioned problems.

It is a further object of the present invention to provide an improved blow-through rotary valve with an increased lifespan, which does not wear as much or as quickly as similar valves in the art.

It is a further object of the present invention to provide a trough suitable for a blow-through rotary valve, which is shaped in a way to produce an aerodynamic effect which reduces the amount of erosion on the outlet and trough of the valve.

For the above reasons, there remains a need to address or mitigate at least one or more of the aforementioned problems.

According to a first aspect of the present invention there is provided a rotary valve comprising: a housing having a housing inlet for receiving material and a housing outlet for releasing the material to a trough, the trough being located adjacent to the housing outlet; a drive shaft having a longitudinal axis, the longitudinal axis defining a drive axis through the rotary valve; a rotor assembly located inside the housing, the rotor assembly being rotatable about the drive axis and comprising at least one rotor chamber operatively connected to the drive shaft; wherein the trough comprises a first end adjacent to a gas inlet and a second end defining a gas outlet, wherein a trough axis extends from the center of the gas inlet to the gas outlet, and wherein the trough axis is substantially parallel to the drive axis; wherein the trough comprises at least one surface to direct gas from the gas inlet to the gas outlet, the at least one surface extending from the first end of the trough to the second end of the trough; and wherein in use, the at least one surface is configured to direct material to the gas outlet; wherein the at least one surface comprises a first portion and a second portion, wherein the first portion and the second portion extend from the first end of the trough to the second end of the trough, and wherein the first portion and the second portion are disposed substantially opposite each other about the trough axis; and wherein, at the first end of the trough, there is a first distance defined as the distance from the first portion to the trough axis, and a second distance defined as the distance from the second portion to the trough axis, wherein the first distance is less than the second distance; and, at the second end of the trough, the first portion and the second portion are substantially equidistant from the trough axis, defined by a third distance.

The present invention therefore relates to a rotary valve comprising a trough which reduces erosion on the outlet of the trough, whilst providing a constant (or substantially constant) and reliable flowrate of material.

There is also provided a rotary valve comprising: a housing having a housing inlet for receiving material and a housing outlet for releasing the material to a trough, the trough being located adjacent to the housing outlet; a drive shaft having a longitudinal axis, the longitudinal axis defining a drive axis through the rotary valve; a rotor assembly located inside the housing, the rotor assembly being rotatable about the drive axis and comprising at least one rotor chamber operatively connected to the drive shaft; wherein the trough comprises a first end adjacent to a gas inlet and a second end defining a gas outlet, wherein a trough axis extends from the center of the gas inlet to the gas outlet, and wherein the trough axis is substantially parallel to the drive axis; wherein the trough comprises at least one surface to direct gas from the gas inlet to the gas outlet, the at least one surface extending from the first end of the trough to the second end of the trough; and wherein in use, the at least one surface is configured to direct material to the gas outlet; and wherein the at least one surface comprises a first portion and a second portion, wherein the first portion and the second portion extend from the first end of the trough to the second end of the trough, and wherein the first portion and the second portion are disposed substantially opposite each other about the trough axis.

Also, there is provided a rotary valve comprising: a housing having a housing inlet for receiving material and a housing outlet for releasing the material to a trough, the trough being located adjacent to the housing outlet; a drive shaft having a longitudinal axis, the longitudinal axis defining a drive axis through the rotary valve; a rotor assembly located inside the housing, the rotor assembly being rotatable about the drive axis and comprising at least one rotor chamber operatively connected to the drive shaft; and wherein the trough comprises a first end adjacent to a gas inlet and a second end defining a gas outlet, wherein a trough axis extends from the center of the gas inlet to the gas outlet, and wherein the trough axis is substantially parallel to the drive axis.

The material to be conveyed by the dosing device may be any type of type of material. In particular embodiments, the material being conveyed may be household and/or industrial waste which is being sent for incineration. Alternatively, the bulk material being transferred may be any type of solid fuel (e.g. wood chips) or any other solid material including powder and/or powder-like material.

When in use, the at least one rotor chamber is configured to receive material from the housing inlet and configured to release the material to the housing outlet. Usually, there are a plurality of rotor chambers which are arranged in a circular pattern around the drive shaft. However, the rotor chambers may be oriented in any appropriate manner.

There may be a dosing device above the rotary valve which, in use, provides the material to be conveyed into the pneumatic pipeline. The material may be fed through the housing inlet and into one of the rotor chambers.

The drive shaft may be configured to rotate around the drive axis, moving the rotor chamber from an upright position to an inverted position. The material may then be released into the trough through the housing outlet. As the material enters the trough, it may be blown out of the gas outlet from the gas coming from the gas inlet. The material then may be conveyed to a pneumatic pipeline, where it may be transported into a furnace and/or another piece of apparatus.

The angle between the first portion and the trough axis may be selected from any of the following: between about 5 degrees and about 35 degrees; between about 5 degrees and about 20 degrees; or between about 10 degrees and 20 degrees. The angle may be dictated by the length of the trough, the size of the gas inlet, and the size of the gas outlet.

The angle between the second portion and the trough axis may be selected from any of the following: between about 0 degrees and about 10 degrees; or between about 0 degrees and about 5 degrees. The angle may be dictated by the length of the trough, the size of the gas inlet, and the size of the gas outlet.

The trough may further comprise a third portion, wherein the third portion is located between the first portion and the second portion. The third portion may act as the floor of the trough, and the first and second portions may act as the walls of the trough. When in use, the material may be discharged from the rotor chambers, the material may fall into the trough and its rotational velocity component may be reduced before impinging the walls created by the first and second portions.

The trough may further comprise a fourth portion and fifth portion, wherein the fourth portion may be located between the first portion and the third portion, and the fifth portion may be located between the third portion and the second portion. The fourth and fifth portions may act as bridge portions between the walls of the trough and the floor of the trough. These portions may improve the airflow between the gas inlet and the gas outlet. There may be more than five portions to further reduce sharp angles were portions meet each other. The trough may comprise any suitable number of portions between the first and second portions.

In use, the first portion of the at least one surface may use the Coanda effect to direct the gas from the gas inlet to the gas outlet, thereby creating a barrier of gas close to the first portion thus reducing wear on the gas outlet. The Coanda effect is the tendency of a fluid jet to stay attached to a surface, and is used often in aircraft design. In this application, the effect is used in an advantageous manner to provide a barrier of gas close to the first portion of the trough. This barrier significantly reduces the tangential velocity of the material, thus reduces wear on the surface of the trough or valve outlet.

The first portion may be positioned away from the gas inlet by about any of the following: from about 5 mm to about 100 mm; from about 5 mm to about 50 mm; or from about 20 mm to about 50 mm. The second portion may also vary in distance from the gas inlet. If the second portion is to be varied, the variations should take into account the first portion's distances, to maintain the desired Coanda effect.

The proximity of the first portion attracts the gas flow from the gas inlet and retains a layer of high velocity gas proximate to the first portion. When the material from the rotor chamber is introduced into the trough, it first enters into contact with the first portion of the trough (due to the rotation of the rotor assembly). Without wishing to be bound by theory, the high velocity gas flow proximate to the first portion entrains the material from the housing outlet and rapidly changes the rotational velocity of the material into longitudinal velocity (in the direction of the trough axis). This velocity direction change prevents the material from impinging on the gas outlet with a high rotational velocity component, therefore reducing wear on the valve.

The above-mentioned effects are produced by the particular geometry of the trough. The geometry may be asymmetrical when the trough is viewed from above. The first and second portions may not be equidistant from the trough axis.

The distance to the first portion from the trough axis may vary at different locations along the length of the trough axis.

The distance to the second portion from the trough axis may vary at different locations along the length of the trough axis.

The gas inlet may be substantially circular. The gas inlet may also be any other suitable shape for conveying gas flow.

The width of the first portion at the first end of the trough may be longer than the width of the first portion at the second end of the trough. The width here is defined as the height or length of the first portion along a y-axis. The width length variation of the first portion along the length of the trough may increase the effectiveness of the Coanda effect.

The distance between the first end and the second end of the trough may be longer than the distance between the first portion and the second portion of the at least one surface of the trough. This is usually the case because most rotary valves have chambers which are generally cuboidal in shape, with their longest edge parallel with the drive axis and the trough axis. For example, the length of the trough may be 1 meter, whilst the width of the trough would be 0.25 meters. The trough may be any shape which is suitable for affixing to the rotary valve housing outlet.

Provided is also a trough for a rotary valve, wherein the trough comprises: a first end adjacent to a gas inlet and a second end defining a gas outlet, wherein a trough axis extends from the center of the gas inlet to the gas outlet, and wherein the trough axis extends substantially normal to the gas inlet; wherein the trough comprises at least one surface for directing the gas from the gas inlet to the gas outlet, the at least one surface extending from the first end of the trough to the second end of the trough; wherein the at least one surface comprises a first portion and a second portion, wherein the first portion and the second portion extend from the first end of the trough to the second end of the trough, and wherein the first portion and the second portion are disposed substantially opposite each other about the trough axis; wherein, at the first end of the trough, there is a first distance defined as the distance from the first portion to the trough axis, and a second distance defined as the distance from the second portion to the trough axis, wherein the first distance is less than the second distance; and, at the second end of the trough, the first portion and the second portion are substantially equidistant from the trough axis, defined by a third distance; wherein, in use, the trough is connected to an outlet of a rotary valve and is configured to receive material from the outlet of the rotary valve and to convey the material from the outlet of the valve to the outlet of the trough.

According to a yet further example of the present invention, there is provided a trough for a rotary valve, wherein the trough comprises: a first end adjacent to a gas inlet and a second end defining a gas outlet, wherein a trough axis extends from the center of the gas inlet to the gas outlet, and wherein the trough axis extends substantially normal to the gas inlet; wherein the trough comprises at least one surface for directing the gas from the gas inlet to the gas outlet, the at least one surface extending from the first end of the trough to the second end of the trough; wherein the at least one surface comprises a first portion and a second portion, wherein the first portion and the second portion extend from the first end of the trough to the second end of the trough, and wherein the first portion and the second portion are disposed substantially opposite each other about the trough axis; wherein, at the first end of the trough, there is a first distance defined as the distance from the first portion to the trough axis, and a second distance defined as the distance from the second portion to the trough axis, wherein the first distance is less than the second distance; and, at the second end of the trough, the first portion and the second portion are substantially equidistant from the trough axis, defined by a third distance.

All alternatives listed above relate to one another.

The gas inlet may be configured to receive pressurized gas, and the gas outlet may be configured to receive the pressurized gas and material.

The angle between the first portion and the trough axis may be selected from any of the following: between from about 5 degrees to about 35 degrees; between from about 5 degrees to about 25 degrees; or between from about 5 degrees to about 20 degrees. The angle may be dictated by the length of the trough, the size of the gas inlet, and the size of the gas outlet.

The angle between the second portion and the trough axis may selected from any of the following: between about 0 degrees and about 10 degrees; or between about 0 degrees and about 5 degrees. The angle may be dictated by the length of the trough, the size of the gas inlet, and the size of the gas outlet.

The trough may further comprise a third portion, wherein the third portion is located between the first portion and the second portion. The third portion may act as the floor of the trough, and the first and second portions may act as the walls of the trough. When the material empties from the rotor chambers, the material falls into the trough and its rotational velocity component may be reduced before impinging the walls created by the first and second portions.

The trough may further comprise a fourth portion and fifth portion, wherein the fourth portion may be located between the first portion and the third portion, and the fifth portion may be located between the third portion and the second portion. The fourth and fifth portions may act as bridge portions between the walls of the trough and the floor of the trough. These portions may improve the airflow between the gas inlet and the gas outlet. There may be more than five portions to further reduce sharp angles were portions meet each other.

In use, the first portion of the at least one surface may use the Coanda effect to direct the gas from the gas inlet to the gas outlet, thereby creating a barrier of gas close to the first portion thus reducing wear on the gas outlet. The first portion may be positioned away from the gas inlet by about any of the following: from about 5 mm to about 100 mm; from about 5 mm to about 50 mm; or from about 20 mm to about 50 mm.

Without wishing to be bound by theory, the proximity of the first portion attracts the gas flow from the gas inlet and retains a layer of high velocity gas proximate to the first portion. When the material from the rotor chamber is introduced into the trough, it first meets with the first portion (due to the rotation of the rotor assembly). This high velocity gas flow proximate to the first portion entrains the material from the housing outlet and rapidly changes the rotational velocity of the material into longitudinal velocity (in the direction of the trough axis). This velocity direction change prevents the material from impinging on the gas outlet with a high rotational velocity component, therefore reducing wear on the valve.

The gas inlet may be substantially circular. The gas inlet may also be any other suitable shape for conveying gas flow.

The width of the first portion at the first end of the trough may be longer than the width of the first portion at the second end of the trough. The width here is defined as the height or length of the first portion along the y-axis. The width length variation of the first portion along the length of the trough may increase the effectiveness of the Coanda effect.

The distance between the first end and the second end of the trough may be longer than the distance between the first portion and the second portion of the at least one surface of the trough. This is usually the case because most rotary valves have chambers which are generally cuboidal in shape, with their longest edge parallel with the drive axis and the trough axis. The trough may be any shape which is suitable for affixing to the rotary valve housing outlet.

According to another example of the present invention, there is provided a method for reducing erosion in a rotary valve, the method comprising: providing a rotary valve as described herein; connecting the rotary valve to a pneumatic pipeline; passing material through the rotary valve and into the trough; providing pressurized gas flow from the gas inlet to the gas outlet, along the trough axis, to entrain and remove the material from the trough, wherein the gas flows adjacent to the first portion of the at least one surface, utilizing the Coanda effect to create a barrier of gas close to the first portion, thus reducing wear on the gas outlet; and conveying the material from the trough to a pneumatic pipeline with the pressurized gas.

There is also provided a trough for a rotary valve, for reducing erosion in the rotary valve, according to the previous aspects of the present invention.

The trough may be asymmetric along the gas conveying longitudinal plane, as the trough varies in diameter/width along the length of the longitudinal plane.

The rotary valve may have a high velocity gas inlet, and one side of the trough may be closer to the high velocity gas inlet than the other side.

This asymmetry may provide a protective high velocity gas barrier, which reduces the erosion on the trough or valve.

Further optional features disclosed in relation to each aspect of the invention correspond to further optional features of each other aspect of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
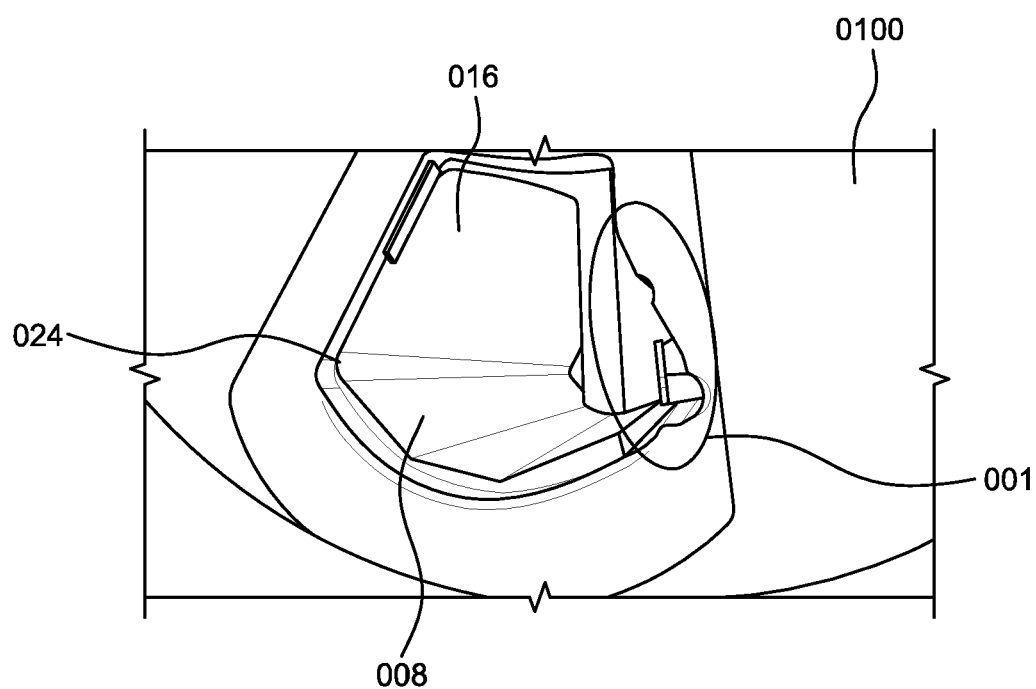
FIG. 1 shows an eroded outlet of a trough of a blow-through rotary valve according to the prior art.

FIG. 1 shows an eroded gas outlet 024 of a trough 008 of a blow-through rotary valve 0100 according to the prior art. As can be seen by the highlighted area 001, the flange of the valve 0100 has been heavily eroded. This is the result of particulate material impinging on the gas outlet 024.

Viewed from the angle in FIG. 1, the rotor chamber 016 rotates in an anti-clockwise direction. The material contained within the rotor chamber 016 is ejected into the trough 008 with considerable tangential velocity due to the rotation of the chambers. This tangential velocity as viewed in FIG. 1 would be moving from the left to the right of the image. The material is then met with high velocity gas flow, coming from the gas inlet and exiting through the gas outlet (this is explained in detail in FIG. 2). The distribution of the gas flow in the trough does not reduce the tangential component of the material velocity enough, resulting in wear and erosion. As can be seen, it is the edge of the gas outlet 024 on the right side of the image which experiences wear and erosion.

It is an aim of the present invention to remove this erosion 001 issue experienced on the gas outlet 024. FIGS. 2 to 6 show a range of representations of an embodiment according to the present invention.

Figure 2:
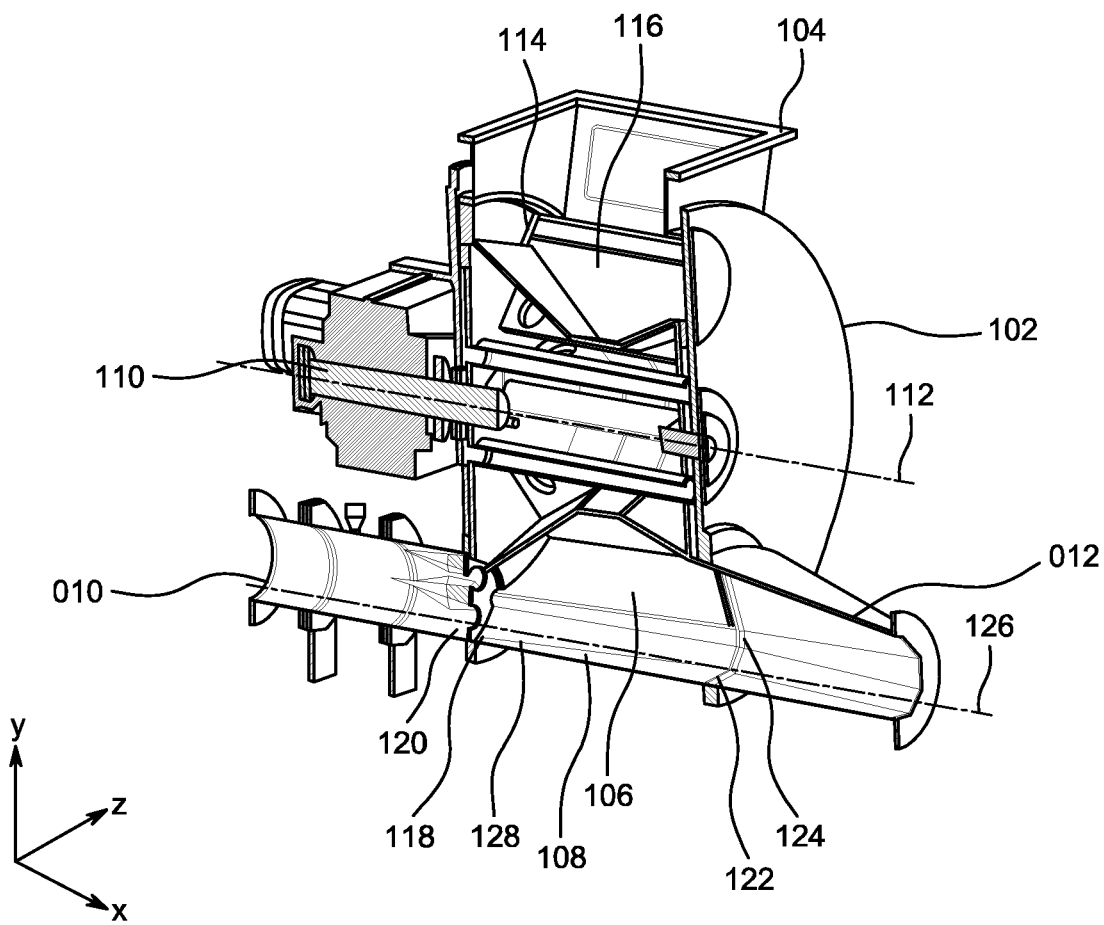
FIG. 2 shows a cross-sectional view (x-y plane) through the center of a rotary valve according to an embodiment of the present invention.

FIG. 2 shows a cross-sectional view (x-y plane) through the center of a rotary valve 100 according to an embodiment of the present invention. The valve 100 has been sectioned to increase clarity. The valve 100 may be a component in a pneumatic conveying system to introduce materials to a pneumatic pipeline. The valve 100 introduces material to the pipeline whilst delivering the material in a safe and effective manner.

The valve 100 comprises a housing 102, which has a housing inlet 104 for receiving material and a housing outlet 106 for releasing the material to a trough 108. The valve 100 further comprises a drive shaft 110 which has a longitudinal axis which defines a drive axis 112. The drive axis 112 extends through the rotary valve 100 (along the x-axis in the figure). The valve 100 is normally made of a metal alloy, with different materials suited to each component. The trough 108 may be lined with material which is resistant to material impact, thus reducing erosion and increasing the longevity of the valve 100. Increasing the life of the trough 108 will prevent downtime for maintenance and allow the pneumatic conveying system to continue to function. This may save the plant owner a significant amount of money.

The valve further comprises a rotor assembly 114 which is located inside the housing 102. The rotor assembly 114 is rotatable about the drive axis 112 and has at least one rotor chamber 116 operatively connected to the drive shaft 110. The at least one rotor chamber 116 may be directly connected to the drive shaft or it may be connected via other components. The drive shaft 110 is connected to a mechanical motor or engine.

The trough 108 has a first end 118 which is adjacent to a gas inlet 120 and a second end 122 which defines a gas outlet 124. A trough axis 126 extends from the center of the gas inlet 120 to the gas outlet 124 and is substantially parallel to the drive axis 112 (x-axis in the Figure). When in use, high velocity gas travels from the pneumatic pipeline 010 through the gas inlet 120, along the trough 108, through the gas outlet 124, and into the outlet cone 012. This gas entrains the material coming from the rotor chambers 116 and conveys the material into the pneumatic system.

The trough 108 comprises at least one surface 128 which directs the material from the rotor chambers 116 to the gas outlet 124, and the gas from the gas inlet 120 to the gas outlet 124. The surface (or surfaces) 128 extend from the first end 118 to the second end 122 of the trough 108, thereby adequately directing the material and gas to the gas outlet 124.

Figure 3:
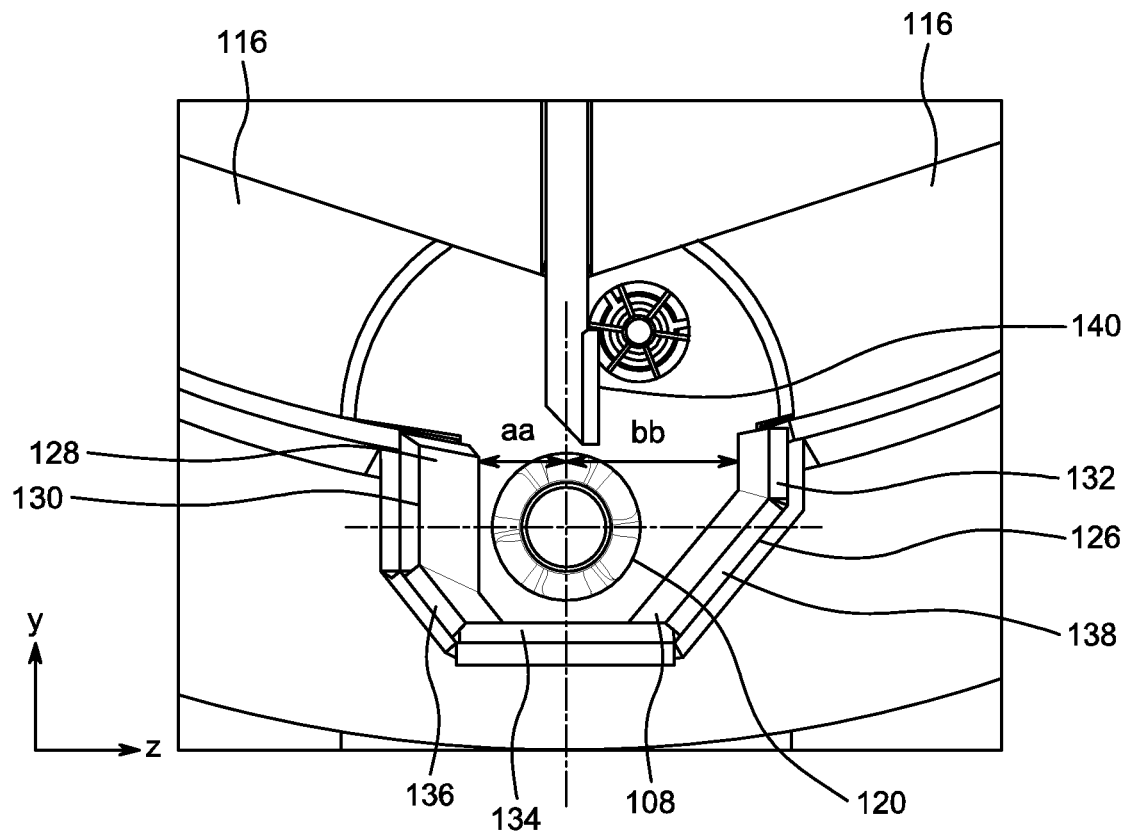
FIG. 3 shows a cross-sectional view (y-z plane) of the rotary valve in FIG. 2, focusing on the gas inlet.
Figure 4:
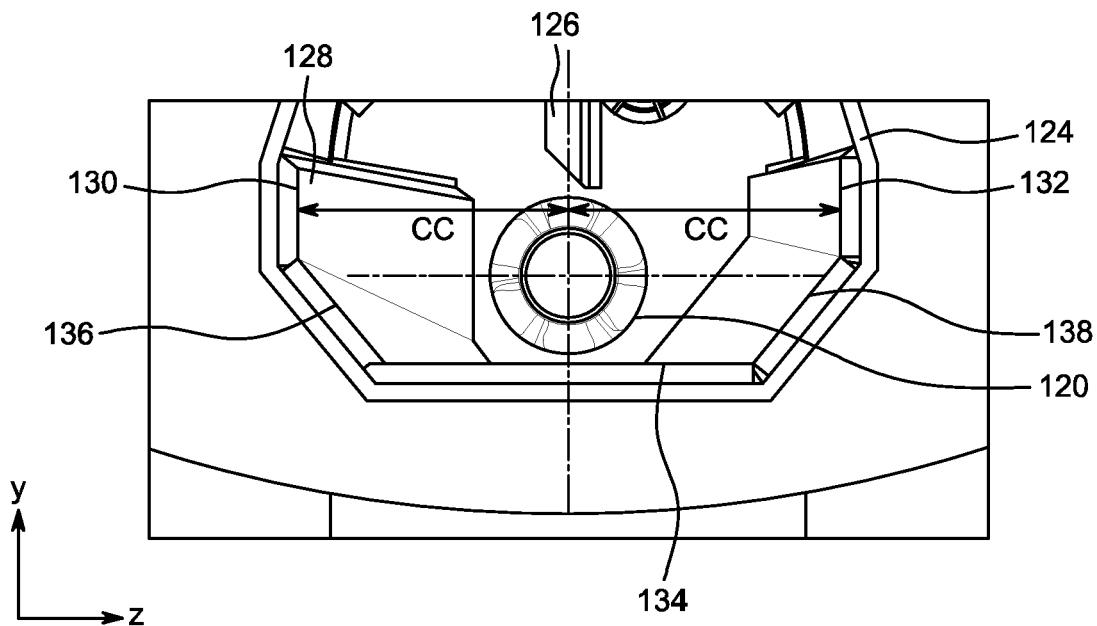
FIG. 4 shows a cross-sectional view (y-z plane) of the rotary valve in FIG. 2, focusing on the gas outlet.

FIG. 3 shows a cross-sectional view (y-z plane) of the rotary valve in FIG. 2, focusing on the gas inlet 120. The view is from the second end 122 of the trough 108, directed towards the gas inlet 120. The cross-sectional slice has been taken in the y-z plane and is close to the gas inlet 120. FIG. 4 is a similar view, however the image is focused on the gas outlet 124, and the cross-sectional slice has been made on the outlet flange of the valve 100, where the outlet cone 012 is fastened onto. The trough axis 126 is shown as a centerline and the inside of two rotatory chambers 116 can be seen.

The trough 108 as shown in FIG. 3 and FIG. 4 has at least one surface 128 which comprises five portions. It should be easily envisaged by the skilled person in the art that there may only be two portions of the one surface 128, thereby only having a first portion 130 and a second portion 132. Alternatively, there may be more than one surface 128. FIGS. 3 and 4 both show a first portion 130 and a second portion 132 which act as the side walls of the trough. The third portion 134 acts as a floor to the trough, and the fourth portion 136 and fifth portion 138 act as intermediate portions, joining the floor to the walls. The skilled person will appreciate that there may be more than five portions in the trough 108, used to direct the gas flow and the material to the gas outlet 124.

In use, the drive shaft 110 turns the rotor assembly 114 which rotates the rotor chambers 116. From the views in FIGS. 3 and 4, the rotor chambers 116 pass from left to right, rotating in an anticlockwise direction. When the blade 140 of the rotor chamber 116 passes over the trough 108, the contents of the rotor chamber 140 begins to drop down onto the first portion 130 of the at least one surface 128. If the rotor assembly 114 rotated in a clockwise direction, then the first portion 130 would be on the opposite side from what is shown in FIGS. 3 and 4. This would be to ensure the material interacts firstly with the first portion 130 of the trough, and not the second portion 132.

As can be seen in FIG. 3, the first portion 130 of the at least one surface 128 is significantly closer to the trough axis 126 than the second portion 132. This is depicted as a first distance (aa) and a second distance (bb) respectively. In FIG. 4, at the second end 122 of the trough 108, the distance between the first portion 130 and the trough axis 126 is the same as the distance between the second portion 132 and the trough axis 126. This is depicted as a third distance (cc). It should be readily appreciated that the portions may not be precisely equidistant from the trough axis 126 at the second end 122 for the trough to still perform its function effectively. The length of the third distance (cc) is usually dictated by the size of the outlet cone 012, which size is dictated by the pneumatic conveying system. The third distance (cc) may be longer than both the first distance (aa) and the second distance (bb).

The first portion 130 of the surface 128 is close to the gas inlet 120 so as to attract the gas flow (the Coanda effect) and to force it to follow the first portion 130 to the gas outlet 124. This creates a barrier of high velocity gas which flows alongside the first portion 130, which is where the highest volume of material from the rotor chambers 116 passes through. It is also the area of the trough 108 which first encounters the material from the rotor chambers 116. This effect therefore increases the longitudinal velocity component (substantially parallel with the trough axis 126), thereby reducing the volume of particles/material which impacts the side of the gas outlet 124, therefore reducing wear on the valve.

The material of the at least one surface 128 may be different to the material which the rotary valve 100 predominately uses. The surface material 128 may be more wear resistant and/or have a wear resistant coating applied. Each portion of the surface may be made from the same material, or alternatively the portions may comprise different materials.

The geometry and layout of the trough as shown in the Figures should not be taken to be limiting. The geometry may look different to that which is shown, whilst maintaining the requirements of claim 1, where at the first end 118 of the trough 108, the first portion 130 is closer to the trough axis 126 than the second portion 132.

FIG. 3 also shows an additional secondary gas inlet (above and right of the main gas inlet 120). The invention should therefore not be limited to a single gas inlet, as the rotary valve may comprise more than one gas inlet (for improved pneumatic conveying, reduced wear, enhanced cleaning of the rotor chambers etc.).

Figure 5:
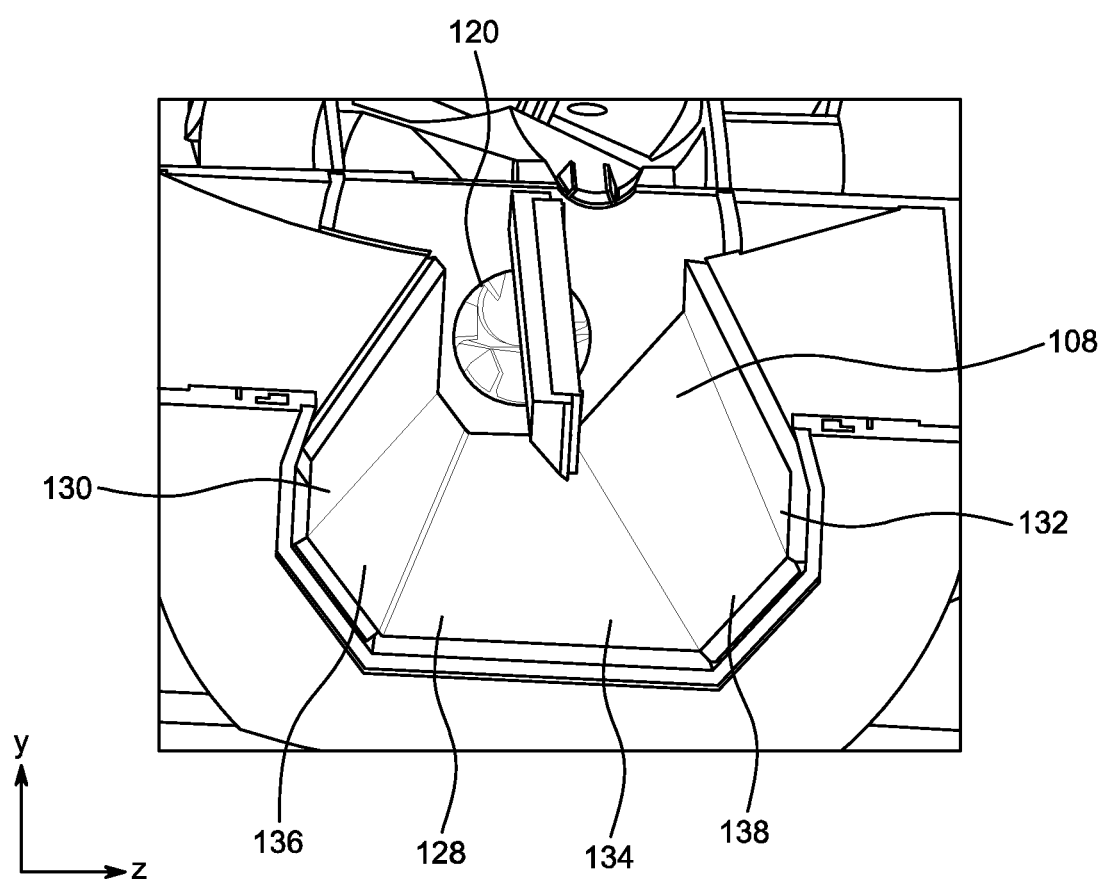
FIG. 5 shows a perspective view (along the x-y plane) of the trough of the rotary valve in FIG. 2, viewed from the gas outlet end to the gas inlet end.

FIG. 5 shows a similar view to FIG. 4; however, the viewpoint has moved up the y-axis to give a different perspective. The gas inlet 120 can more clearly be seen, along with the five portions of the at least one surface 128. The third portion 134 in this embodiment performs the function of the trough 108 base/floor. As shown, the width (z-axis) of the third portion 134 increases from the first end 118 to the second end 122. In alternative embodiments, the width of the third portion 134 may decrease from the first end 118 to the second end 122. The shapes of the individual portions shown in the figures should not be construed as being limiting. The widths and configuration of the portions may be dictated by the number of portions and the length of the trough 108.

Figure 6:
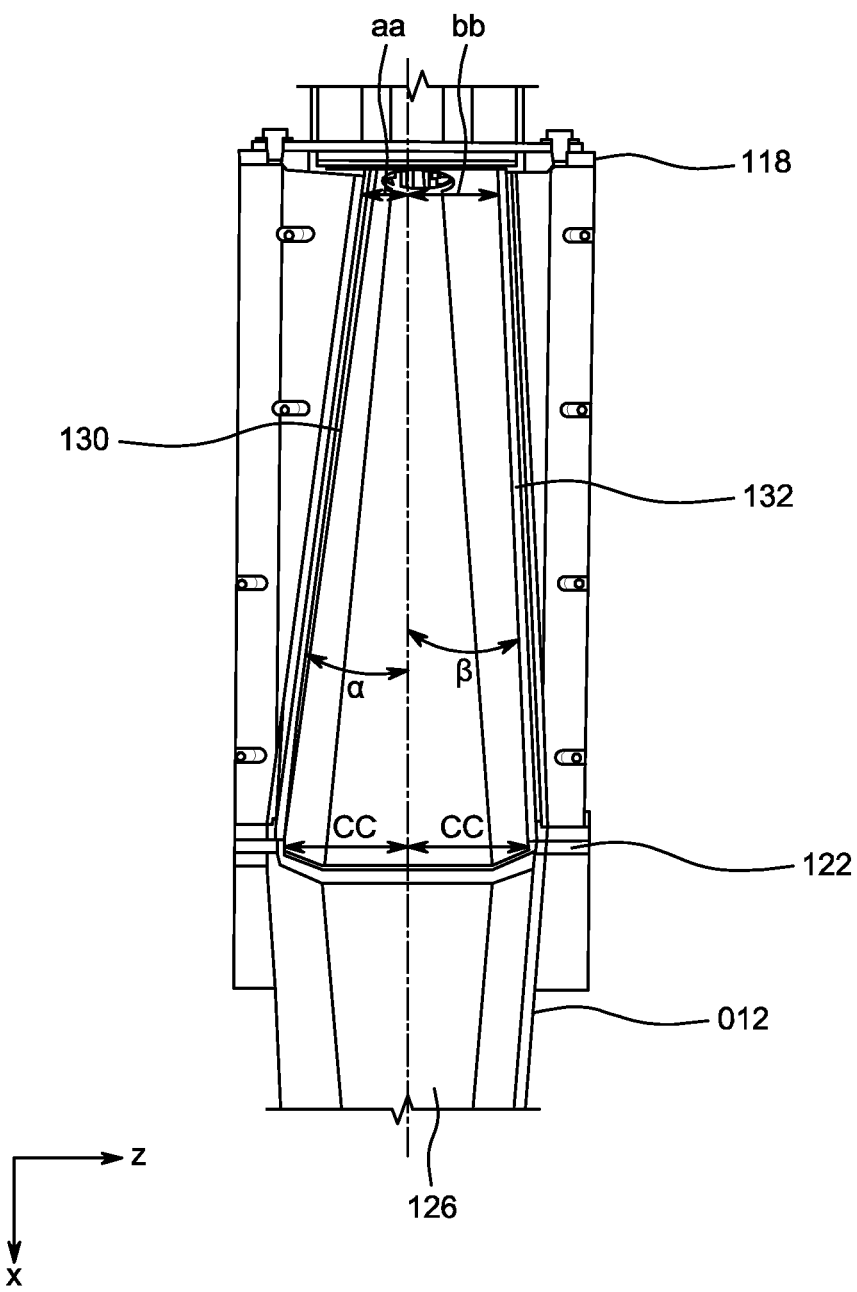
FIG. 6 shows a cross-sectional view (x-z plane) of the rotary valve in FIG. 2, depicting a plan view of the trough.

FIG. 6 shows a cross-sectional view (x-z plane) of the rotary valve 100 in FIG. 2, depicting a plan view of the trough 108. The trough axis 126 is shown, along with the distances (aa, bb, cc) between the first portions 130 and second portions 132 to the trough axis 126. Further defined is the angle □ between the first portion 130 and the trough axis 126, and the angle □ between the second portion 132 and the trough axis 126. The outlet cone 012 can be seen attached to the second end 122 of the trough 108.

Whilst various exemplary embodiments have been disclosed, it shall be understood that variations, modifications and combinations of the valve and methods disclosed herein disclosed herein may be made without departing from the scope of the appended claims.

What is claimed is:
1. A rotary valve comprising:
a housing having a housing inlet for receiving material and a housing outlet for releasing the material to a trough, the trough being located adjacent to the housing outlet;
a drive shaft having a longitudinal axis, the longitudinal axis defining a drive axis through the rotary valve; and
a rotor assembly arranged inside the housing, the rotor assembly being rotatable about the drive axis and comprising at least one rotor chamber operatively connected to the drive shaft, wherein the trough comprises a first end adjacent to a gas inlet and a second end defining a gas outlet, wherein a trough axis extends from the center of the gas inlet to the gas outlet, the trough axis being substantially parallel to the drive axis, wherein the trough comprises at least one surface to direct gas from the gas inlet to the gas outlet, the at least one surface extending from the first end of the trough to the second end of the trough, wherein the at least one surface is configured to direct material to the gas outlet, wherein the at least one surface comprises a first portion and a second portion, the first portion and the second portion extending from the first end of the trough to the second end of the trough, the first portion and the second portion being disposed substantially opposite each other about the trough axis, wherein, at the first end of the trough, there is a first distance defined as the distance from the first portion to the trough axis, and a second distance defined as the distance from the second portion to the trough axis, and wherein the first distance is less than the second distance and, at the second end of the trough, the first portion and the second portion are substantially equidistant from the trough axis, defined by a third distance.

2. The rotary valve according to claim 1, wherein the at least one rotor chamber is configured to receive material from the housing inlet and configured to release the material to the housing outlet.

3. The rotary valve according to claim 1, wherein the gas inlet is configured to receive pressurized gas, and wherein the gas outlet is configured to receive the pressurized gas and material.

4. The rotary valve according to claim 1, wherein an angle between the first portion and the trough axis is between about 5 degrees and about 35 degrees, between about 5 degrees and about 20 degrees, or between about 10 degrees and 20 degrees.

5. The rotary valve according to claim 1, wherein an angle between the second portion and the trough axis is between about 0 degrees and about 10 degrees, or between about 0 degrees and about 5 degrees.

6. The rotary valve according to claim 1, wherein the trough further comprises a third portion, and wherein the third portion is located between the first portion and the second portion.

7. The rotary valve according to claim 6, wherein the trough further comprises a fourth portion and a fifth portion, and wherein the fourth portion is located between the first portion and the third portion, and the fifth portion is located between the third portion and the second portion.

8. The rotary valve according to claim 1, wherein the first portion of the at least one surface uses the Coanda effect to direct the gas from the gas inlet to the gas outlet, thereby creating a barrier of gas close to the first portion and thus reducing wear on the gas outlet.

9. The rotary valve according to claim 1, wherein the gas inlet is substantially circular.

10. The rotary valve according to claim 1, wherein the width of the first portion at the first end of the trough is longer than the width of the first portion at the second end of the trough.

11. The rotary valve according to claim 1, wherein the distance between the first end and the second end of the trough is longer than the distance between the first portion and the second portion of the at least one surface of the trough.

12. The rotary valve according to claim 1, wherein the material to be conveyed is any refuse derived fuel.

13. A trough for a rotary valve, wherein the trough comprises:

a first end adjacent to a gas inlet;

a second end defining a gas outlet; and a trough axis extending from a center of the gas inlet to the gas outlet, the trough axis extending substantially normal to the gas inlet, wherein the trough comprises at least one surface for directing the gas from the gas inlet to the gas outlet, the at least one surface extending from the first end of the trough to the second end of the trough, wherein the at least one surface comprises a first portion and a second portion, wherein the first portion and the second portion extend from the first end of the trough to the second end of the trough, wherein the first portion and the second portion are disposed substantially opposite to each other about the trough axis, wherein, at the first end of the trough, there is a first distance defined as a distance from the first portion to the trough axis, and a second distance defined as a distance from the second portion to the trough axis, wherein the first distance is less than the second distance, wherein, at the second end of the trough, the first portion and the second portion are substantially equidistant from the trough axis defined by a third distance, and wherein the trough is adapted to be connected to an outlet of a rotary valve and is configured to receive material from the outlet of the rotary valve and to convey the material from the outlet of the valve to the outlet of the trough.

14. The trough according to claim 13, wherein the gas inlet is configured to receive pressurized gas, and the gas outlet is configured to receive the pressurized gas and material.

15. The trough according to claim 13, wherein the angle between the first portion and the trough axis is between about 5 degrees and about 35 degrees, between about 5 degrees and about 20 degrees, or between about 10 degrees and 20 degrees.

16. The trough according to claim 13, wherein the angle between the second portion and the trough axis is between about 0 degrees and about 10 degrees, or between about 0 degrees and about 5 degrees.

17. The trough according to claim 13, wherein the trough further comprises a third portion, wherein the third portion is located between the first portion and the second portion.

18. The trough according to claim 17, wherein the trough further comprises a fourth portion and a fifth portion, wherein the fourth portion is located between the first portion and the third portion, and wherein the fifth portion is located between the third portion and the second portion.

19. The trough according to claim 13, wherein the first portion of the at least one surface uses the Coanda effect to direct the gas from the gas inlet, thereby creating a barrier of gas close to the first portion, thus reducing wear on the gas outlet.

20. The trough according to claim 13, wherein the gas inlet is substantially circular.

21. The trough according to claim 13, wherein the width of the first portion at the first end of the trough is longer than the width of the first portion at the second end of the trough.

22. The trough according to claim 13, wherein the distance between the first end and the second end of the trough is longer than the distance between the first portion and the second portion of the at least one surface of the trough.

23. The trough according to claim 13, wherein the material to be conveyed is a refuse derived fuel.

24. A method for reducing erosion in a rotary valve, the method comprising:
- providing a rotary valve according to claim 1;
- connecting the rotary valve to a pneumatic pipeline;
- passing material through the rotary valve and into the trough;
- providing pressurized gas flow from the gas inlet to the gas outlet along the trough axis to entrain and remove the material from the trough, the gas being configured to flow adjacent to the first portion of the at least one surface;
- utilising the Coanda effect to create a barrier of gas close to the first portion to reduce wear on the gas outlet; and
- conveying the material from the trough to a pneumatic pipeline with the pressurized gas.

\* \* \* \* \*